United States Patent [19]
Tanimoto et al.

[11] Patent Number: 5,187,495
[45] Date of Patent: Feb. 16, 1993

[54] IMAGE FORMING APPARATUS FOR OBTAINING IMAGE UPON SCANNING WITH LASER BEAM

[75] Inventors: Koji Tanimoto; Kazuo Sasama, both of Kawasaki, Japan

[73] Assignee: Kabushiki Kaisha Toshiba, Kawasaki, Japan

[21] Appl. No.: 669,595

[22] Filed: Mar. 14, 1991

[30] Foreign Application Priority Data

Mar. 16, 1990 [JP] Japan .................. 2-65858

[51] Int. Cl.$^5$ .................. G01D 15/16; H04N 1/21
[52] U.S. Cl. .................. 346/108; 355/200
[58] Field of Search .............. 346/108, 160; 355/200, 355/202

[56] References Cited

U.S. PATENT DOCUMENTS 4,885,596 12/1989 Egawa et al. .................. 355/202

Primary Examiner—Mark J. Reinhart
Attorney, Agent, or Firm—Foley & Lardner

[57] ABSTRACT

According to this invention, optical the path lengths from two semiconductor laser oscillators to a photosensitive body are different from each other. Oscillation is switched between the two semiconductor laser oscillators to change the beam shape of a laser beam on the photosensitive body. Since the beam shape of the laser beam can be controlled at accurate timings, a good image can be obtained, and a thin line and a high quality gradation image can be reproduced on a single image. An image having no gradation levels and an image having gradation levels can be simultaneously formed both with high quality.

8 Claims, 20 Drawing Sheets

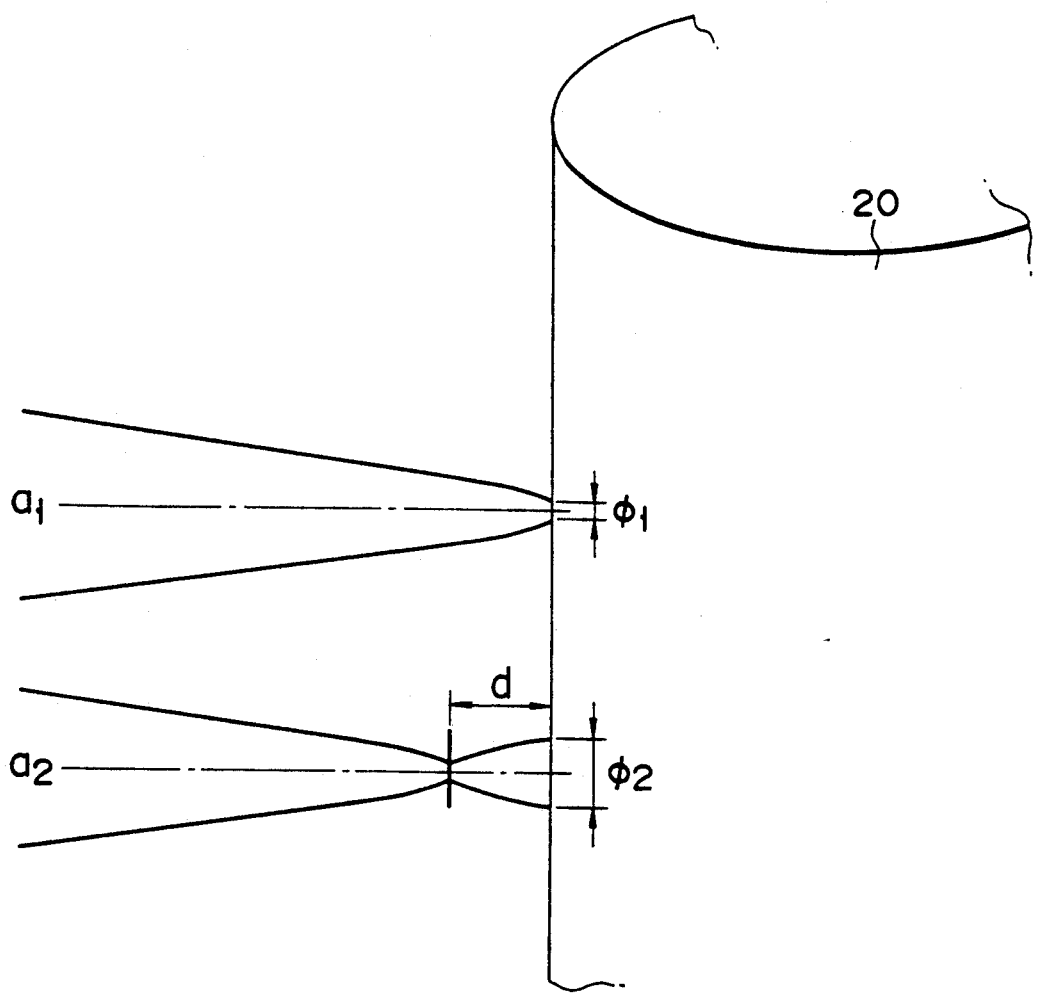
F I G. 4

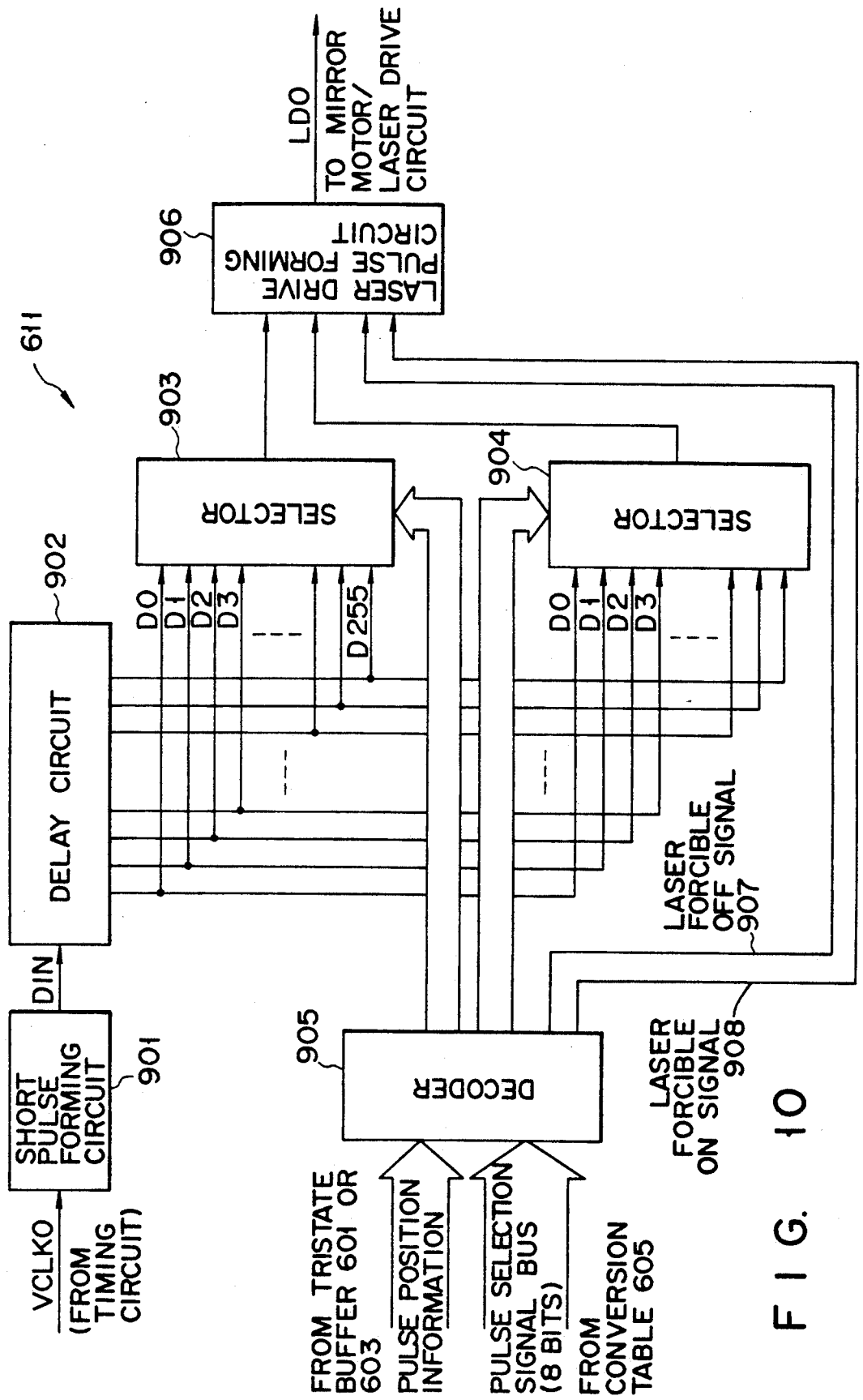
F I G. 10

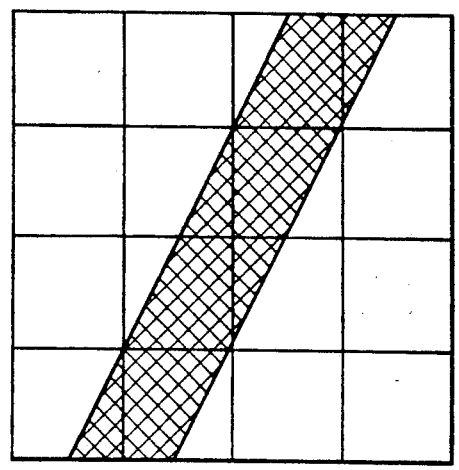
F I G. 15A
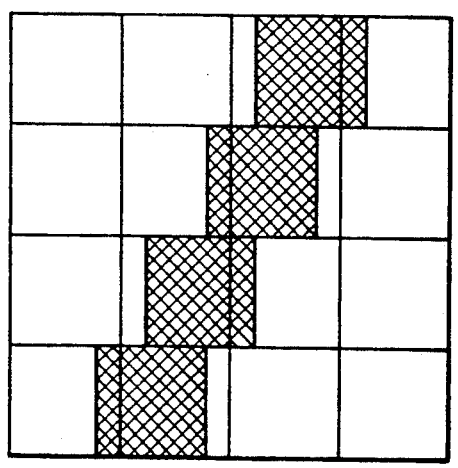
F I G. 15B

IMAGE FORMING APPARATUS FOR OBTAINING IMAGE UPON SCANNING WITH LASER BEAM

BACKGROUND OF THE INVENTION

1. Field of the Invention

The present invention relates to an image forming apparatus used in a laser printer, a digital copying machine, or a facsimile apparatus for assuring high image quality in accordance with the types of images to be recorded.

2. Description of the Related Art

Since a conventional image forming apparatus, such as a laser printer, cannot perform halftone recording in accordance with 1-dot recording, an image such as a character or line image having no gradation levels is simply binarized, and an image is formed using the resultant binary data. To the contrary, image formation of an image, such as a photograph having gradation levels, is performed in accordance with a systematic dither or area gradation method as a binarization method. In recent years, in a laser printer, there is provided a pulse width modulation method wherein the width of a laser drive pulse is set to be variable to improve reproducibility of thin lines and to allow gradation expressions (Japanese Patent Application No. 1-79571).

It is difficult to reproduce both an image such as a character or line image and an image such as a photograph having gradation levels with high quality even with the above pulse width modulation method. If an image write laser beam has a sufficiently small beam size, a very thin line can be reproduced with pulse width modulation. When an image having gradation levels is to be reproduced, however, only the same effect as in the area gradation method is obtained (although image quality can be improved by a degree corresponding to the size reduction).

If the size of the image write laser beam is almost equal to a pixel size, an image density can be controlled in accordance with pulse width modulation. This technique is suitable for reproducing an image having gradation levels, such as a photograph, but is not suitable for reproducing a very thin line such as a character or line image due to a decrease in image density.

Both an image having no gradation levels and an image having gradation levels cannot be simultaneously formed with high quality according to the conventional techniques, resulting in inconvenience.

SUMMARY OF THE INVENTION

It is an object of the present invention to provide an image forming apparatus capable of forming both an image having no gradation levels and an image having high quality gradation levels.

According to the present invention, there is provided an optical apparatus adapted for an image forming apparatus for forming a latent image on an image bearing member, comprising: means for generating a laser beam; means for exposing the generated laser beam on the image bearing member to form the latent image thereon, the laser beam exposed on the image bearing member having a first light energy distribution; and means for changing an optical path length of the laser beam from the generating means to the image bearing member so as to change the light energy distribution of the laser beam on the image bearing member from the first light energy distribution to a second light energy distribution different from the first light energy distribution.

According to the present invention, there is also provided an optical apparatus adapted for an image forming apparatus for forming a latent image on an image bearing member, comprising: first and second generating means for generating a laser beam, the first and second generating means are located at positions having different optical path lengths to the image bearing member, respectively; means for exposing the laser beams generated by the first and second generating means to the image bearing member to form the latent image thereon; and means for selecting one of the first and second generating means, so that an energy distribution of the laser beam exposed on the image bearing member may be changed in accordance with the selected generating means.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is a view for explaining the shape of a laser beam on a photosensitive body of FIG. 1 upon a change in optical path length;

FIG. 10 is a block diagram showing an arrangement of a pulse generator shown in FIG. 7;

FIGS. 15A and 15B are views showing an image to be expressed, and an image formed by using the rise and fall timing selection signals output from the decoder shown in FIG. 10;

DETAILED DESCRIPTION OF THE PREFERRED EMBODIMENTS

Figure 1:
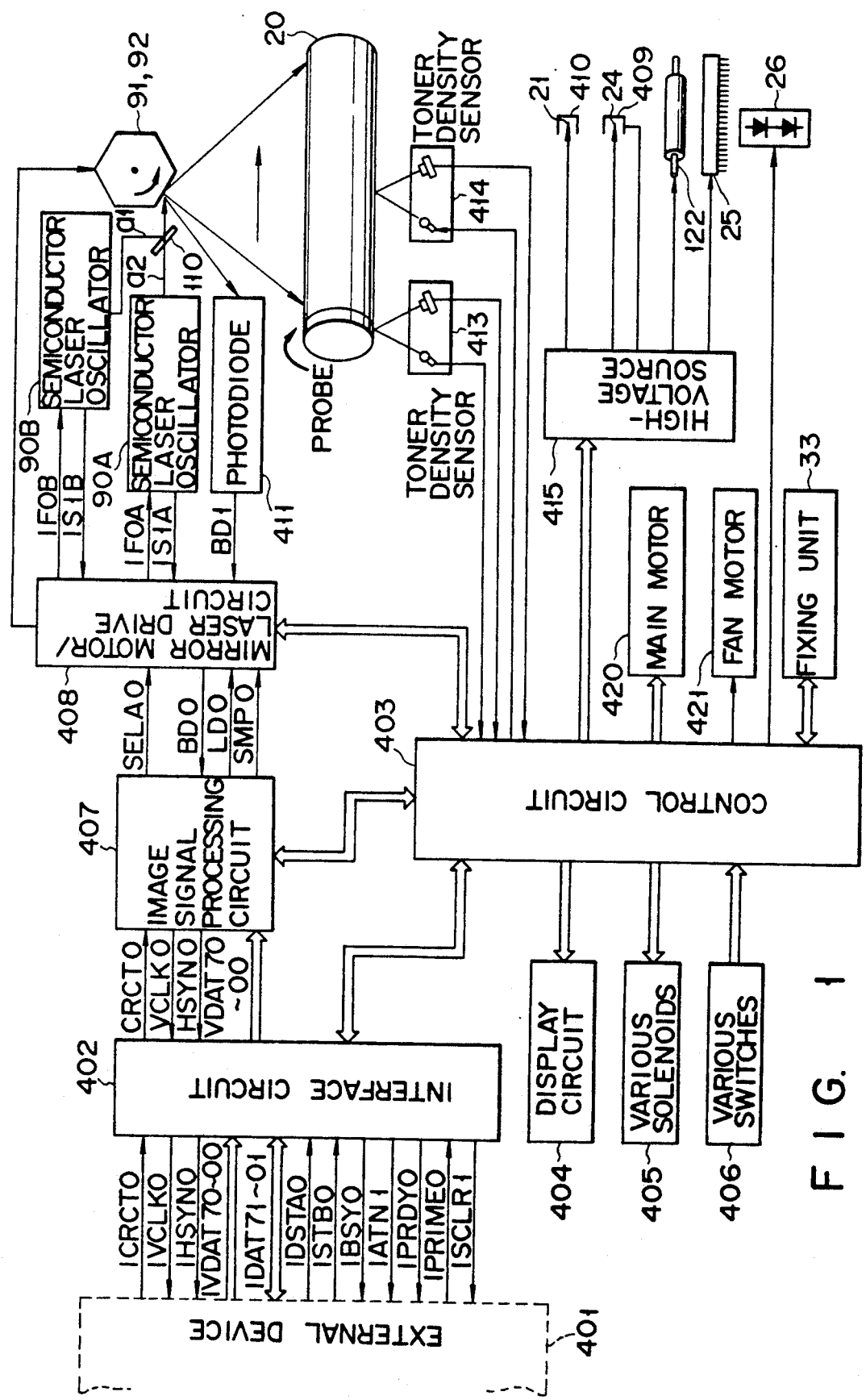
FIG. 1 is a block diagram showing a schematic arrangement of an embodiment of an overall control system of an image forming apparatus according to the present invention.

FIG. 1 schematically show the internal arrangement of an electrophotographic image forming apparatus using a semiconductor laser according to an embodiment of the present invention. This image forming apparatus (laser printer) is connected to a host system (not shown) serving as an external apparatus such as a word processor through an interface circuit.

When the image forming apparatus receives a print start signal from this host system, an image recording operation is started to record an image on a sheet serving as a transfer medium, and the recorded image as a hard copy on the sheet is output.

This image forming apparatus has the following arrangement.

Figure 2:
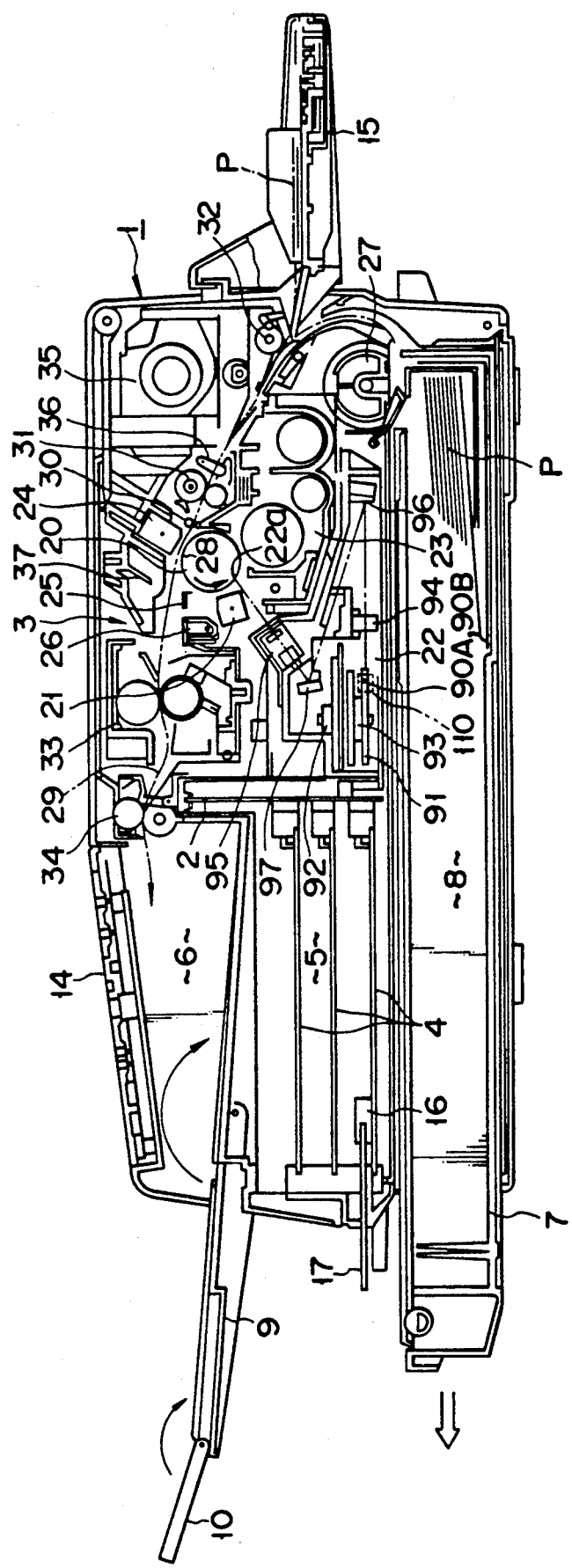
FIG. 2 is a longitudinal sectional side view showing an arrangement of the image forming apparatus shown in FIG. 1.

Referring to FIG. 2, reference numeral 1 denotes an apparatus main body. A main control board 2 is located at the central portion of the main body 1. An electrophotographic process unit 3 is arranged behind the main control board 2 (i.e. to the right in FIG. 2) to form an image. A control board storage portion 5 for storing a plurality of additional function control boards 4 and a paper discharge portion 6 are formed in the front lower and the front upper portions in the main body 1, respectively.

A maximum of three additional function control boards 4 can be mounted in accordance with additional functions (e.g., extension of fonts and types of kanji characters). Additional function IC cards 17 are inserted into three IC card connectors 16 arranged at the front end portion of the lowest additional function control board 4 to further increase the number of functions.

Two interface connectors (not shown) are formed on the left end face of the lowest additional function control board 4. These interface connectors oppose openings (not shown) formed in the left side surface of the main body 1.

The lower portion in the main body 1 serves as a cassette storage portion 8 for storing a paper cassette 7.

The paper discharge portion 6 is constituted by a recess formed on the upper front surface of the main body 1. A foldable paper discharge tray 9 is arranged at the front edge of the paper discharge portion 6, so that the paper discharge tray 9 can be folded on the paper discharge portion 6. A notch (not shown) is formed at the front central portion of the paper discharge tray 9. A U-shaped auxiliary paper discharge tray 10 is foldably arranged to be stored in the notch.

The size of the paper discharge portion 6 can be adjusted in accordance with the size of a sheet P to be discharged.

A control panel 14 having indicator LEDs (not shown), a two-digit state display 7-segment display (not shown), and switches (not shown) is arranged on the upper surface of a left frame portion (not shown) of the main body which is located on the left side of the paper discharge portion 6. A manual feed tray 15 is mounted on the rear surface side of the main body 1.

The electrophotographic process unit 3 for performing electrophotographic processes such as charging, exposure, development, transfer, separation, cleaning, and fixing will be described below.

A drum-like photosensitive body 20 serving as an image carrier is located almost at the center of the unit storage portion. A charger 21 consisting of a SCOROTRON, an exposure portion 22a of a laser exposure unit 22 serving as a latent image forming means, a magnetic brush type developing unit 23 for simultaneously performing development and cleaning, a transfer charger 24 consisting of a SCOROTRON, a memory removal brush 25, and a pre-exposure lamp 26 are sequentially arranged around the photosensitive body 20 along its rotational direction.

A sheet convey path 29 is formed in the main body 1 to convey a sheet P to the paper discharge portion 6 on the upper surface of the main body 1 through an image transfer portion 28 formed between the photosensitive body 20 and the transfer charger 24. In this case, a sheet P is fed from the paper cassette 7 through a paper feed means 27 or a sheet P is manually fed from the manual feed tray 15.

A convey roller pair 30, an aligning roller pair 31, and a convey roller pair 32 are disposed on the upstream side of the image transfer portion 28 along the sheet convey path 29.

A fixing unit 33 and a paper discharge roller unit 34 are arranged on the downstream side of the image transfer portion 28 along the sheet convey path 29. A cooling fan unit 35 is located above the position of the convey roller pair 32.

An aligning switch 36 is arranged near the aligning roller pair 31. A convey guide 37 is disposed near the image transfer portion 28.

Upon reception of a print start signal from the host system, the drum-like photosensitive body 20 is rotated and is charged by the charger 21. A laser beam a1 or a2 modulated with dot image data from the host system is used to scan and expose the photosensitive body 20 with the laser exposure unit 22. A latent image corresponding to the image signal is formed on the photosensitive body 20. The latent image on the photosensitive body 20 is developed with a toner in a developing agent magnetic brush in the developing unit 23, so that a visible image is obtained.

In synchronism with the toner image formation process, the sheet P picked up from the paper cassette 7 or manually fed from the manual feed tray 15 is fed through the aligning roller pair 31, and the toner image formed on the photosensitive body 20 is transferred to the sheet P by the behavior of the transfer charger 24. The sheet P is then fed to the fixing unit 33 through the sheet convey path 29. The toner image is melted and fixed on the sheet P. The sheet P having the fixed toner image is discharged to the paper discharge portion 6 through the discharge roller unit 34.

After the toner image is transferred to the sheet P, the residual toner left on the photosensitive body 20 is removed by the memory removal brush 25 e.g., a conductive brush.

Figure 3:
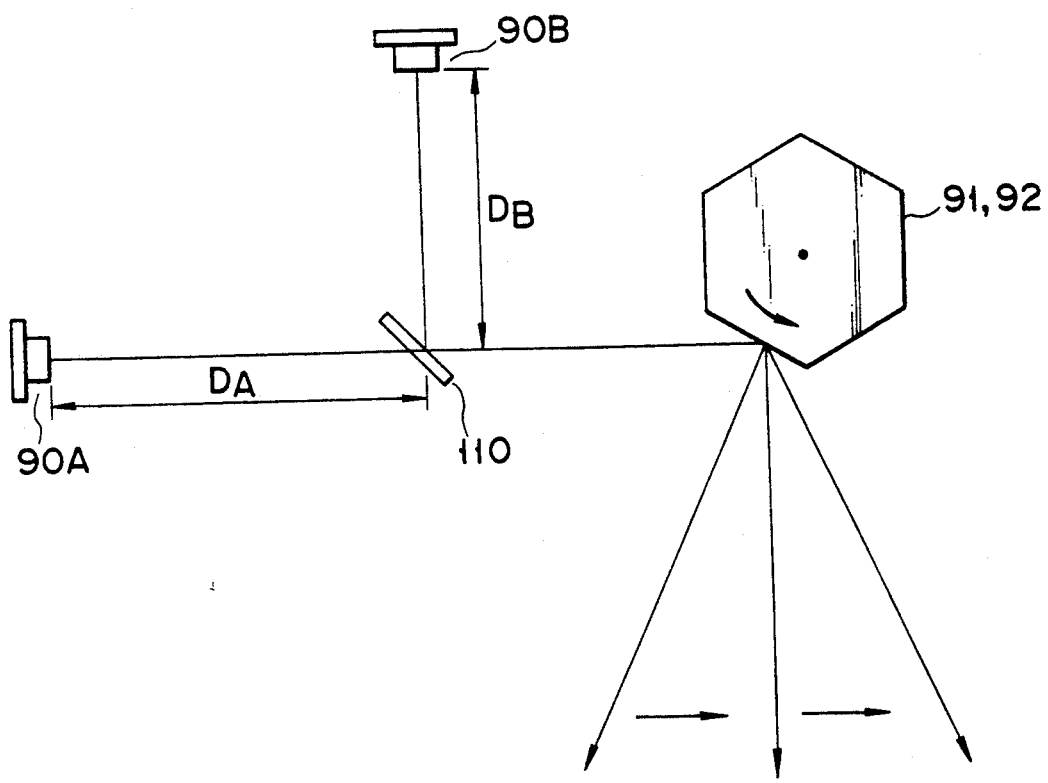
FIG. 3 is a view for explaining the main part of a laser exposure unit shown in FIG. 2.

As shown in FIGS. 1, 2 and 3, the laser exposure unit 22 includes semiconductor laser oscillators 90A and 90B, a half mirror 110 for transmitting or reflecting a laser beam from the semiconductor laser oscillator 90A or 90B, a polygonal mirror scanner 93 consisting of a polygonal mirror 91 and a mirror motor 92, a first f-θ lens 94, a second f-θ lens 95, and reflecting mirrors 96 and 97 for scanning the scanned laser beam a to a predetermined position.

The half mirror 110 passes a laser beam from the semiconductor laser oscillator 90A to guide it to the polygonal mirror 91, and reflects a laser beam from the semiconductor laser oscillator 90B to guide it to the polygonal mirror 91. The two semiconductor laser oscillators 90A and 90B can serve as a single semiconductor laser oscillator by means of the half mirror 110.

A distance DB between the half mirror 110 and the semiconductor laser oscillator 90B is smaller than a distance DA between the half mirror 110 and the semiconductor laser oscillator 90A by about 3 mm. Therefore, the semiconductor laser oscillator 90B is closer to the photosensitive body 20 than the semiconductor laser oscillator 90A by about 3 mm.

A laser beam generated by the semiconductor laser oscillator 90B corresponds to the laser beam al shown in FIG. 4, and a laser beam generated by the semiconductor laser oscillator 90A corresponds to the laser beam a2 shown in FIG. 4.

A control system of the image forming apparatus will be described with reference to the block diagram of FIG. 1.

Referring to FIG. 1, reference numeral 401 denotes an external device which is connected to this image forming apparatus through the interface connector. The image forming apparatus is connected to a host system as the external device 401 such as a computer, a word processor, or an image processing apparatus. The external device 401 is electrically connected to the image forming apparatus through an interface circuit 402.

The following interface signals are prepared for this interface circuit 402. That is, a signal IVCLKO is a clock signal output from this image forming apparatus to the external device 401. The external device 401 outputs 8-bit image data IVDAT70 to IVDAT00 and a signal ICRCT0 in synchronism with this clock signal. The signal ICRCT0 is a signal representing the type of image data. When the image data represents image data such as a character or line image having no gradation levels, the signal ICRCT0 is set at low level. However, when the image data represents image data such as a photograph having gradation levels, the signal ICRCT0 is set at high level.

A signal IHSYN0 signal is output from this image forming apparatus to the external device 401 prior to transfer of one-scanning image data in response to a horizontal sync signal. Signals IDAT71 to IDAT01 are 8-bit bidirectional data bus signals.

A command from the external device 401 is received or a status signal representing a state of this image forming apparatus is output to the external device 401 through this data bus. A signal IDSTA0 is a signal for determining a data transfer direction of the 8-bit data bus. A signal ISTB0 is a strobe signal for causing the image forming apparatus to receive a command. Signals IDSTA0 and ISTB0 are also output from the external device 401.

A signal IBSY0 signal is a busy signal representing that the image forming apparatus is processing a command from the external device 401. A signal IATN1 is an attention signal output from the image forming apparatus when an emergency which should be signaled to the external device 401 occurs in the image forming apparatus.

A signal IPRDY0 is a signal representing that the image forming apparatus is ready. A signal IPRIME0 is a reset signal output from the external device 401 to the image forming apparatus. A signal ISCLR1 is a clear signal output from the image forming apparatus to the external device 401 upon power-ON/OFF operation of the image forming apparatus.

Signals received from the interface circuit 402 to the inside of the image forming apparatus are supplied to a control circuit 403 and an image processing circuit 407.

The control circuit 403 is constituted by a microcomputer and its peripheral circuits to perform various data processing operations and various types of control. The main functions of the control circuit 403 are summarized as follows.

(1) Information from the interface circuit 402 i.e., a command from the external device 401 is decoded to control the respective circuit components of the image forming apparatus in accordance with the decoded command. A status signal corresponding to the command from the external device 401 is output to the external device 401 through the interface circuit 402. The control circuit 403 also performs output control of the signals IATN1, IPRDY0 and ISCLR1.

(2) The control circuit 403 outputs display contents to indicator LEDs (not shown) in the control panel 14 and a display circuit 404 for driving a 7-segment display (not shown).

(3) The control circuit 403 controls ON/OFF operations of solenoids 405.

(4) The control circuit 403 processes various types of information from switches 406.

(5) The control circuit 403 sets various parameters and outputs internal pattern data to the image signal processing circuit 407.

(6) The control circuit 403 performs ON/OFF control of the mirror motor 92, setting of a laser power, and power monitoring for a mirror motor/laser drive circuit 408.

(7) The control circuit 403 controls the ON/OFF operations of toner density sensors 413 and 414 and light-emitting diodes and processes toner density information from the sensors 413 and 414.

(8) The control circuit 403 controls a high-voltage power source 415. More specifically, the control circuit 403 performs ON/OFF control of an output to the charger 21 and sets its output power, performs ON/OFF control of an output to the transfer charger 24 and sets its output power, performs ON/OFF control of an output to a transfer grid 409 and sets its output power, performs ON/OFF control of an output to a developing bias and its output power and performs ON/OFF control of an output to the memory removal brush 25 and sets its output power. In addition, the control circuit 403 also monitors whether all the outputs are normal.

(9) The control circuit 403 performs ON/OFF control of a main motor 420 and monitors whether the main motor 420 is normally operated.

(10) The control circuit 403 performs ON/OFF control of a fan motor 421.

(11) The control circuit 403 performs ON/OFF control of the pre-exposure lamp 26.

(12) The control circuit 403 monitors the temperature of a heat roller in the fixing unit 33 and performs ON/OFF control of a heater lamp.

As briefly described above, the control circuit 403 corresponds to a command unit of this image forming apparatus.

The relationship between the interface circuit 402, the control circuit 403, the image signal processing circuit 407, the mirror motor/laser drive circuit 408, the mirror motor 92, the semiconductor laser oscillators 90A and 90B, a photodiode 411, and the photosensitive body 20 will be described in detail below.

As illustrated in FIG. 1, a laser beam emitted from the semiconductor laser oscillator 90A or 90B is guided to the polygonal mirror 91 rotated in a direction indicated by an arrow by means of the mirror motor 92 through the half mirror 110. The laser beam is then reflected by the polygonal mirror 91 and is scanned on the photosensitive body 20 from the left to the right. Note that the photodiode 411 is located on the left side of the photosensitive body 20. The laser beam a scans the photodiode 411 prior to scanning of the photosensitive body 20, thereby causing the photodiode 411 to generate a signal BD1. A signal BD0 is derived from this signal BD1.

Figure 5:
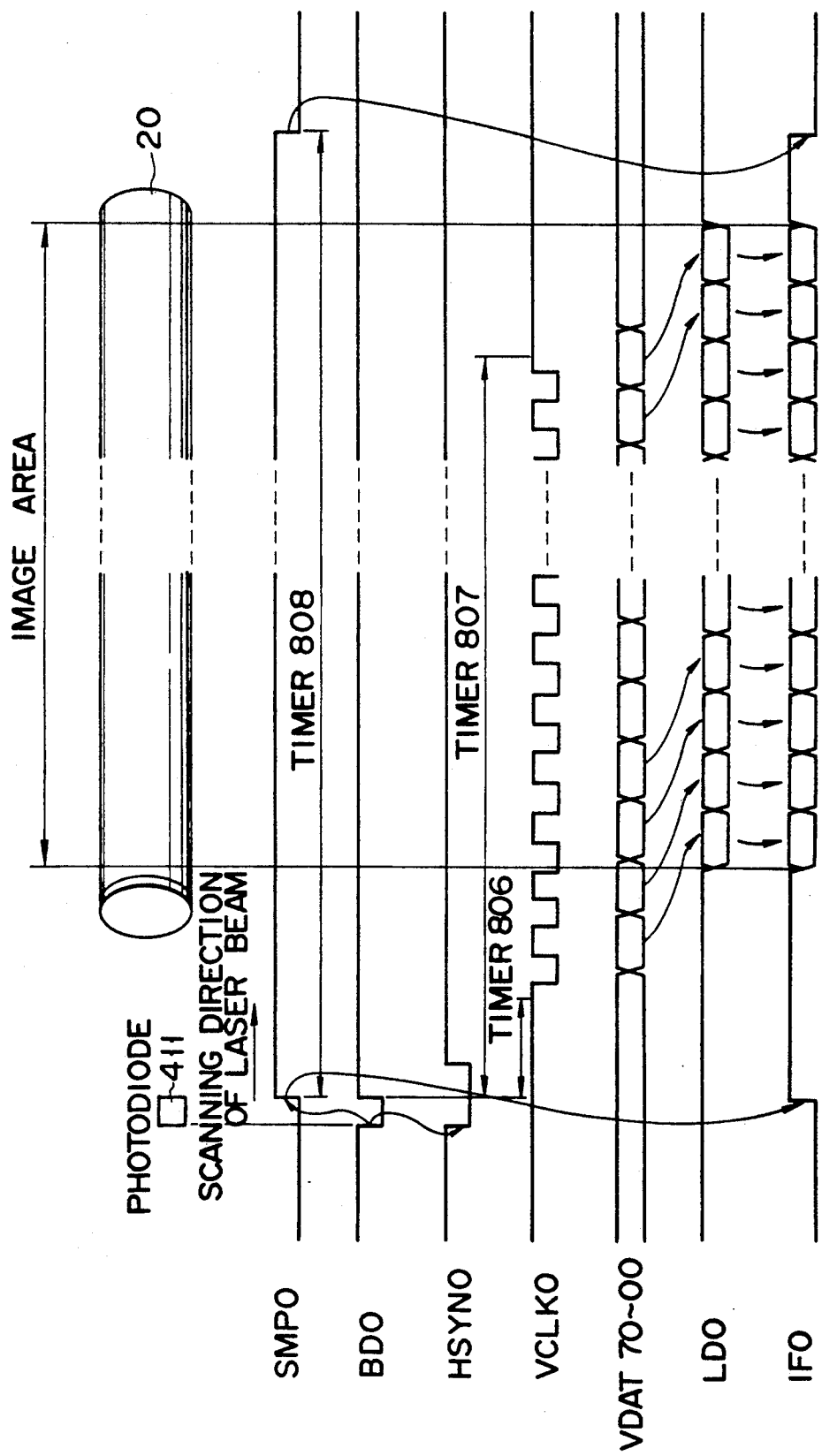
FIG. 5 is a timing chart for explaining an operation of an image signal processing circuit shown in FIG. 1.

A timing chart of the respective signals during scanning is shown in FIG. 5. Referring to FIG. 5, a signal SMP0 is a laser drive signal used to cause the semiconductor laser oscillator 90A or 90B to emit light in a region outside the image area to monitor an emission power. The signal SMP0 is also used to obtain the reference signal BD1 (BD0) from the photodiode 411.

A signal HSYN0, is used to derive the signal IHSYN0 and is generated on the basis of the signal BD0. The signal VCLK0 is used to derive the signal IVCLK0 and is output by a number corresponding to the location and length of an image area. Signals VDAT70 to VDAT00 are image data equivalent to the signals IVDAT70 to IVDAT00 sent in synchronism with the signal IVCLK0. A signal LD0 is obtained by converting 8-bit image data to a laser drive signal.

Figure 6:
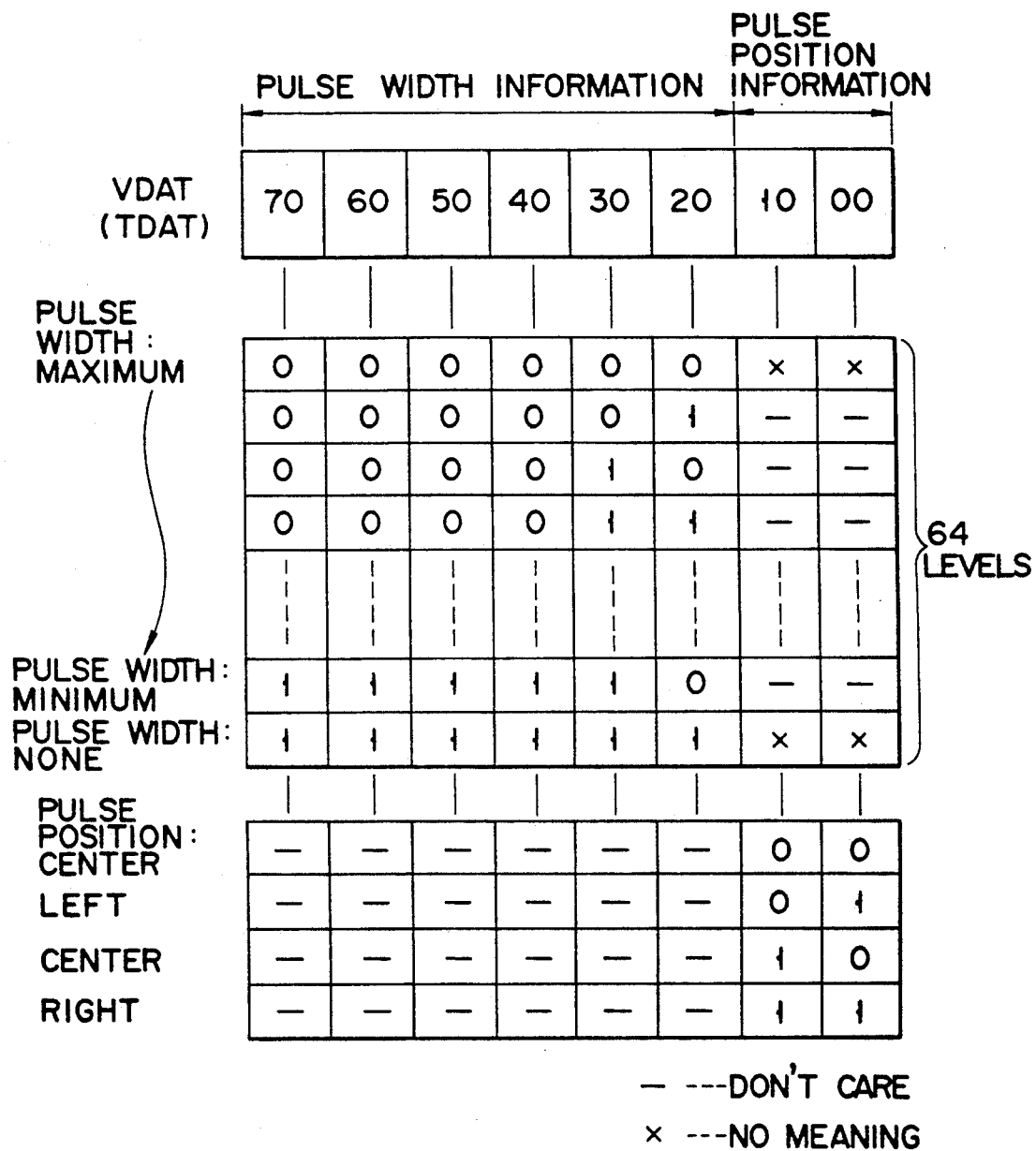
FIG. 6 is a view for explaining a format of image data used in the image signal processing circuit shown in FIG. 1.

In this image forming apparatus, one-pixel data is 8-data. As shown in FIG. 6, this 8-bit data can designate a laser emission time (pulse width) and its position. A signal IF0 is an actual laser drive signal and is obtained as a result of synthesis of the signals SMP0 and LD0.

Figure 7:
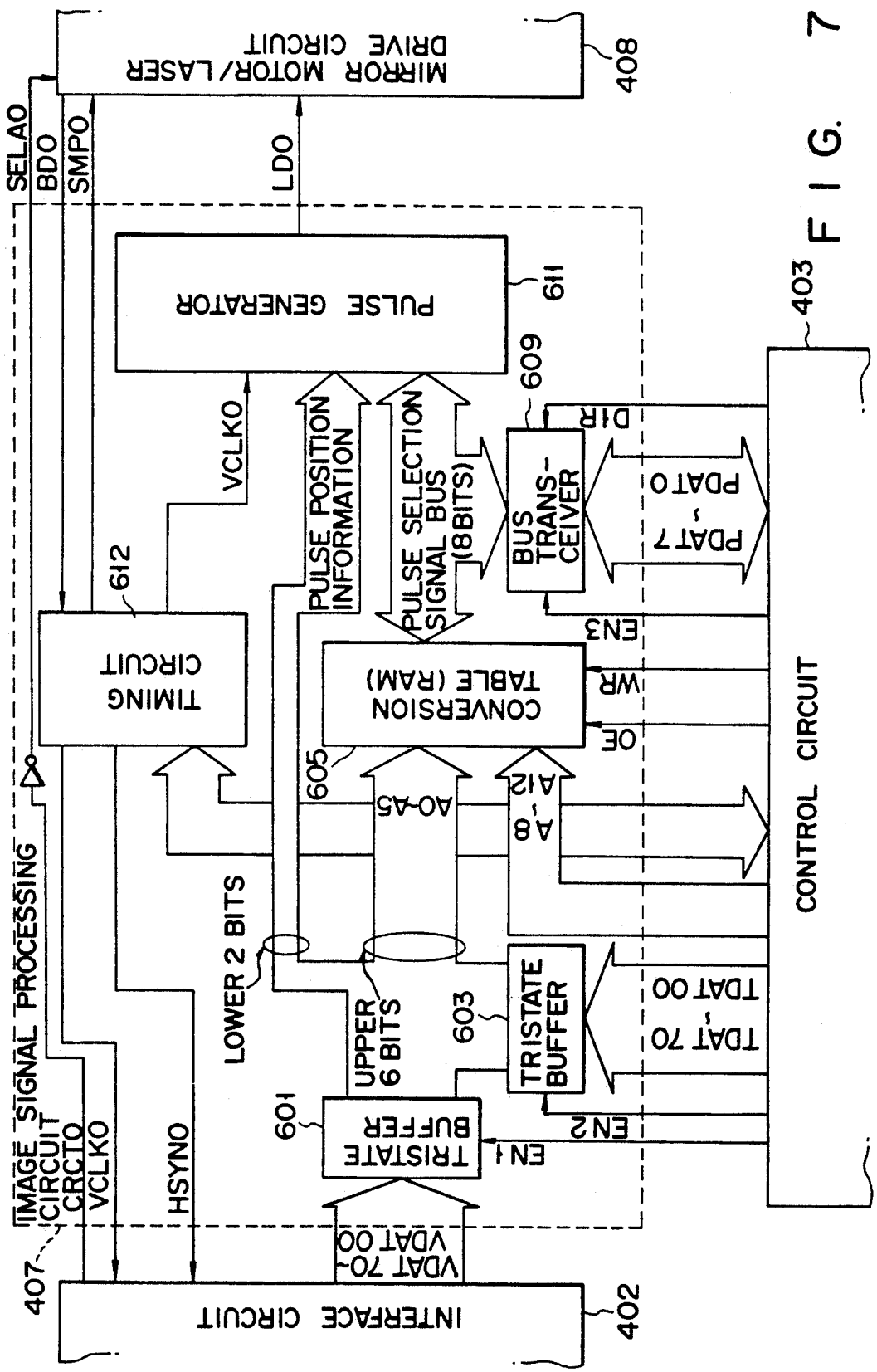
FIG. 7 is a block diagram showing the image signal processing circuit shown in FIG. 1.

The image signal processing circuit 407 will be described in detailed with reference to FIG. 7. Referring to FIG. 7, only when a signal EN1 from the control circuit 403 is set at low level, a tristate buffer 601 supplies upper six bits (VDAT70 to VDAT20) of the image data from the interface circuit 402 to a conversion table 605 of a RAM for converting the image data to a pulse selection signal, and supplies the lower two bits (VDAT10 and VDAT00) to a pulse generator 611 as pulse position information.

Similarly, only when a signal EN2 from the control circuit 403 is set at low level, a tristate buffer 603 supplies the upper six bits (TDAT70 to TDAT20) of the image signal from the control circuit 403 to the conversion table 605 and supplies the lower two bits (TDAT10 and TDAT00) to a pulse generator 611 as pulse position information.

The control circuit 403 controls so that the signal EN1 and EN2 do not simultaneously have the same level. An address of the RAM constituting the conversion table 605 receives the image data at the lower six bits (A0 to A5) and receives the data from the control circuit 403 at the upper seven bits (A8 to A12).

A signal OE and a signal WR output from the control circuit 403 are supplied to the conversion table 605. The signal OE is an output enable signal for the conversion table 605. When the signal OE is set at low level, a content of the conversion table 605 which is designated by the address bits A0 to A12 is output onto a pulse selection signal bus.

The signal WR is a write signal for the conversion table 605. When the signal WR is set at low to high level, data on the pulse selection signal bus is written in the conversion table 605.

An 8-bit bus transceiver 609 outputs data of the pulse selection signal bus onto PDAT7 to PDAT0 when a signal EN3 from the control circuit 403 is set at low level and a signal DIR from the control circuit 403 is set at low level.

When the signal EN3 from the control circuit 403 is set at low level and the signal DIR from the control circuit 403 is set at high level, the bus transceiver 609 outputs data of PDT7 to PDT0 onto the pulse selection signal bus.

That is, the control circuit 403 can freely read- or write-access the content of the conversion table 605 by controlling the signals EN1, EN2, OE, WR, EN3, and DIR.

Whether data output from the interface circuit 402 or data output from the control circuit 403 is used as pulse position information for the pulse generator 611 can be selected.

In addition, whether data output from the conversion table 605 or data (PDAT7 to PDAT0) output from the control circuit 403 is used as the pulse selection signal can be selected.

The image forming apparatus can generate various types of printing patterns for itself. An image data format used in the image forming apparatus can be defined, as shown in FIG. 6.

The signal CRCT0 (ICRCT0) representing the type of image data from the interface circuit 402 is inverted and is input to the mirror motor/laser drive circuit 408 as a signal SELA0 (i.e., a selection signal for the semiconductor laser oscillators 90A and 90B).

A timing circuit 612 arranged in the image signal processing circuit 407 will be described in detail with reference to FIGS. 8 and 9.

Figure 8:
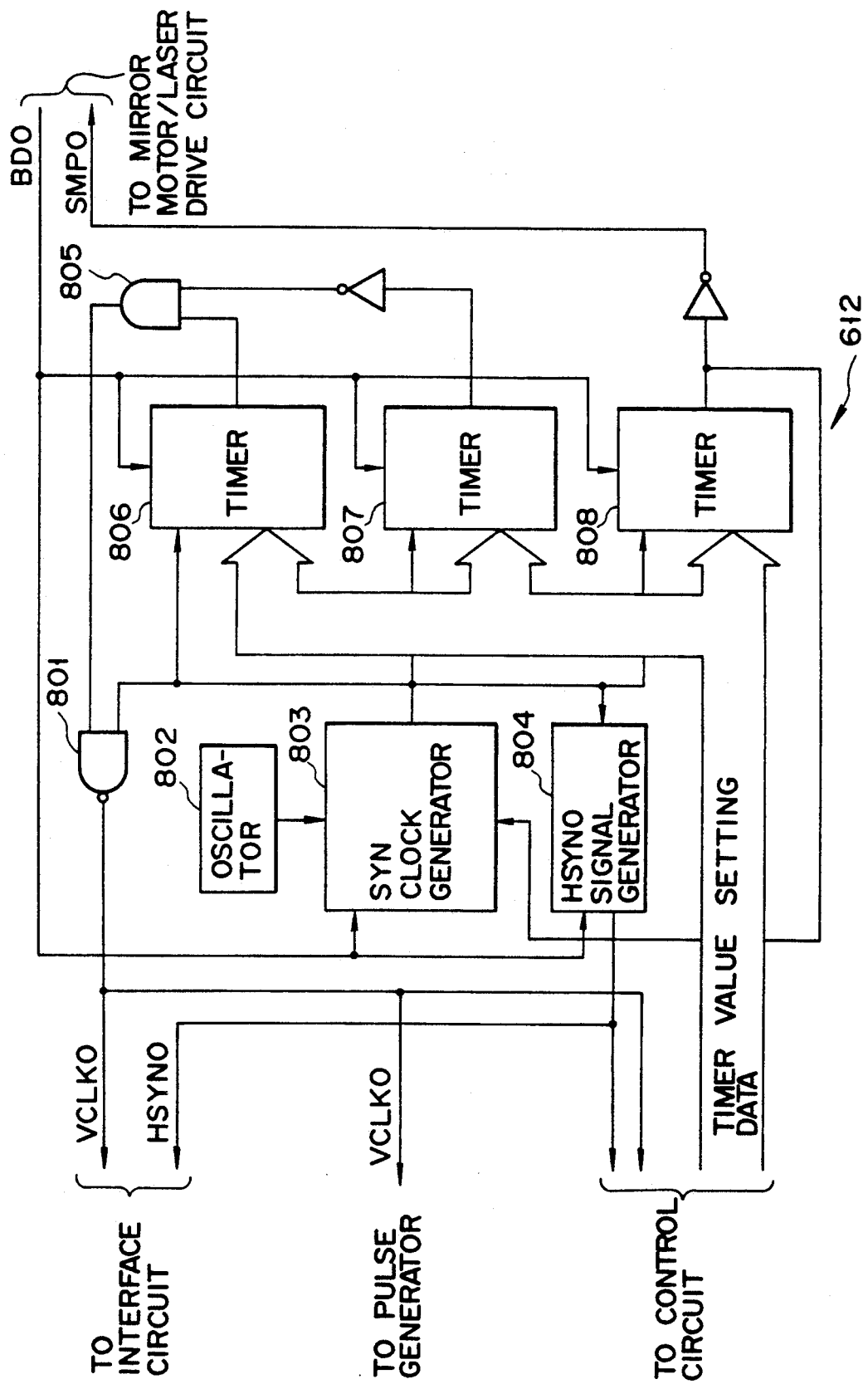
FIG. 8 is a block diagram showing an arrangement of a timing circuit shown in FIG. 7.

FIG. 8 is a block diagram of the timing circuit 612. The timing circuit 612 generates the image data transfer clock signal VCLK0, the horizontal sync signal HSYN0, and the signal SMP0 for emitting a laser in a non-image area on the basis of the signal BD0 from the mirror motor/laser drive circuit 408. FIG. 9 is a timing chart showing an operation of the timing circuit 612.

Figure 9:
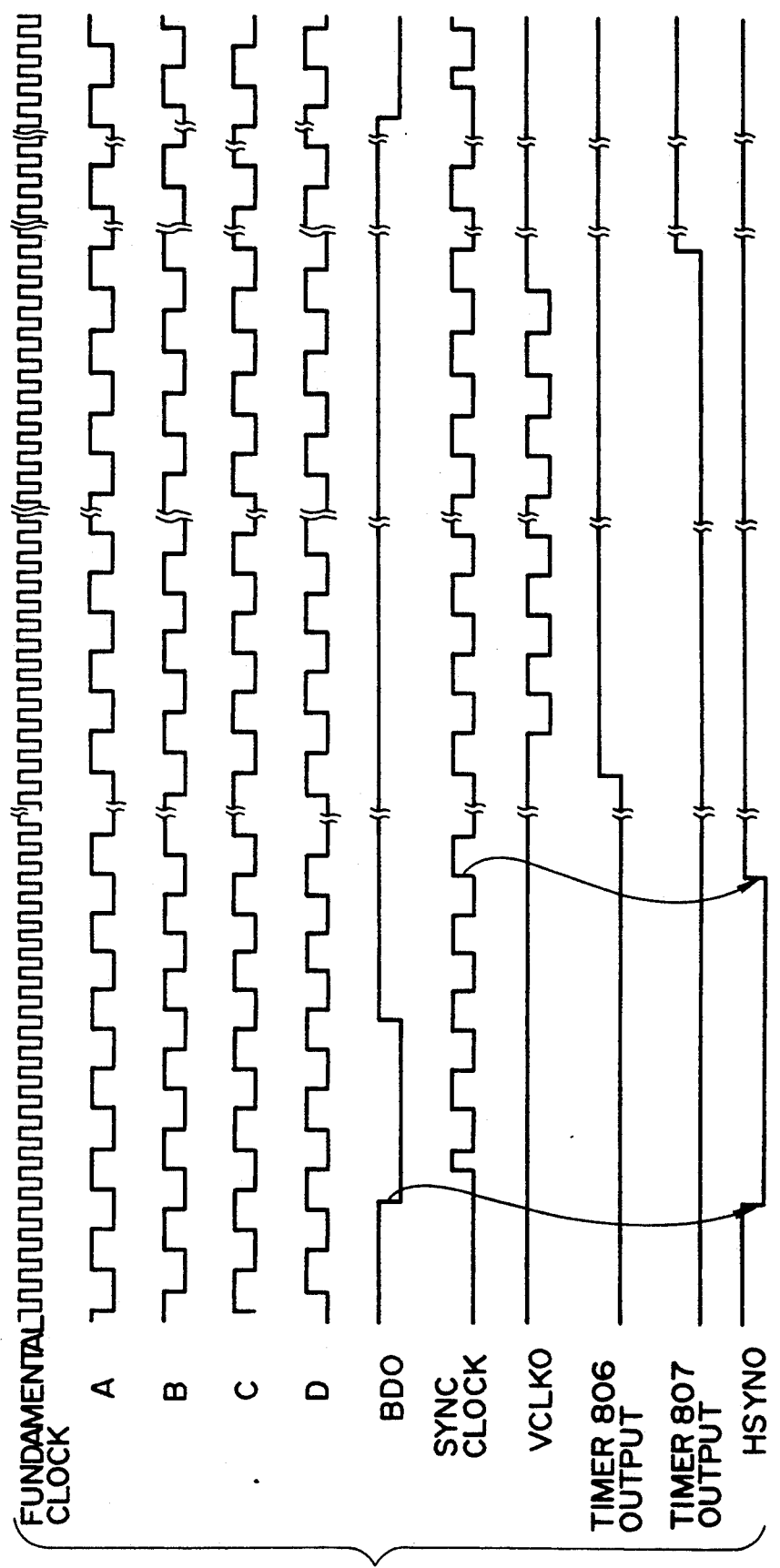
FIG. 9 is a timing chart for explaining an operation of the the timing circuit shown in FIG. 7.

A fundamental clock output from an oscillator 802 is divided into ¼ by a sync clock generator 803, so that a frequency-divided signal has the same frequency as the signal VCLK0 (IVCLK0), as shown in FIG. 9. In this case, four timing signals A, B, C, and D are generated. When the signal BD0 is input to the sync clock generator 803, one of the timing signals A, B, C, and D is selected as a sync clock.

The sync clock generator 803 is arranged to select a signal having a waveform changed from low level to high level for the first time after the signal BD0 goes to low level.

In the timing chart of FIG. 9, the timing signal A is selected. Although the first pulse of the sync clock is not synchronized with the waveform of the timing signal A, it is generated due to the specific circuit arrangement and does not pose any problem.

A timing signal having a predetermined relationship with the signal BD0 is selected from the plurality of timing signals because when a plurality of laser line beams are scanned on the photosensitive body 20, a dot position error between lines in the main scanning direction is reduced.

The signal VCLK0 is generated using timers 806 and 807 on the basis of the sync clock generated as described above. Timer values (timer value setting data) corresponding to the image area are set from the control circuit 403 to the timers 806 and 807 in advance, as shown in FIG. 8.

The timers 806 and 807 reset in response to the signal BD0 count sync clock pulses output from the sync clock generator 803. When counts of the timers 806 and 807 reach preset count values, the outputs from the timers 806 and 807 go to high level.

As shown in FIG. 9, the output from the timer 806 goes to high level, and then the output from the timer 807 goes to high level. As shown in FIG. 8, a signal obtained by inverting the output from the timer 807 and the output signal from the timer 806 are input to an AND gate 805. An AND output from the AND gate 805 is input to a NAND gate 801 to obtain pulses VCLK0, the number of which corresponds to the image area.

The signal HSYN0 goes to low level when the signal BD0 goes from high level to low level. The signal HSYN0 is kept at low level by a predetermined number of pulses (four pulses in this embodiment) of the sync clock signal. The signal SMP0 is generated by using the output from a timer 808. The operation of the timer 808 is identical with that of each of the timers 806 and 807.

The sync clock is disabled when the output from the timer 808 is supplied to the sync clock generator 803. The relationship between the signals SMP0, BD0, HSYN0, and VCLK0 and the photosensitive body 20 is shown in FIG. 5.

A detailed arrangement of the pulse generator 611 shown in FIG. 7 will be described with reference to the circuit diagram of FIG. 10.

The image data transfer clock VCLK0 sent from the timing generator 612 is input to a short pulse forming circuit 901 to generate a short pulse DIN synchronized with the clock signal VCLK0. The short pulse DIN is input to a delay circuit 902 to generate sequentially delayed short pulses D0, D1, D3, . . . D255. These pulses D0 to D255 have a length of time falling within one period of the signal VCLK0. These delayed short pulses D0 to D255 are input to two selectors 903 and 904.

The pulse position information from the tristate buffer 601 or 603 and the pulse selection signal (8 bits) from the conversion table 605 or the bus transceiver 609 are input to a decoder 905 and are decoded into rise and fall timing selection signals which determine a laser drive pulse width and timing.

When a laser drive pulse need not be generated (i.e., white) or when a laser beam is kept ON by one pixel (i.e., black), a laser forcible OFF signal 907 or a laser forcible ON signal 908 is sent to a laser drive pulse forming circuit 906.

The decoder 905 is constituted by a memory such as a ROM or a logic circuit such as a PAL.

The rise and fall timing selection signals from the decoder 905 are input to the selectors 903 and 904, respectively. The selectors 903 and 904 select one pulse each of the short pulses D0 to D255 and output the selected pulses as as rise and fall timing pulses, respectively.

Figure 11:
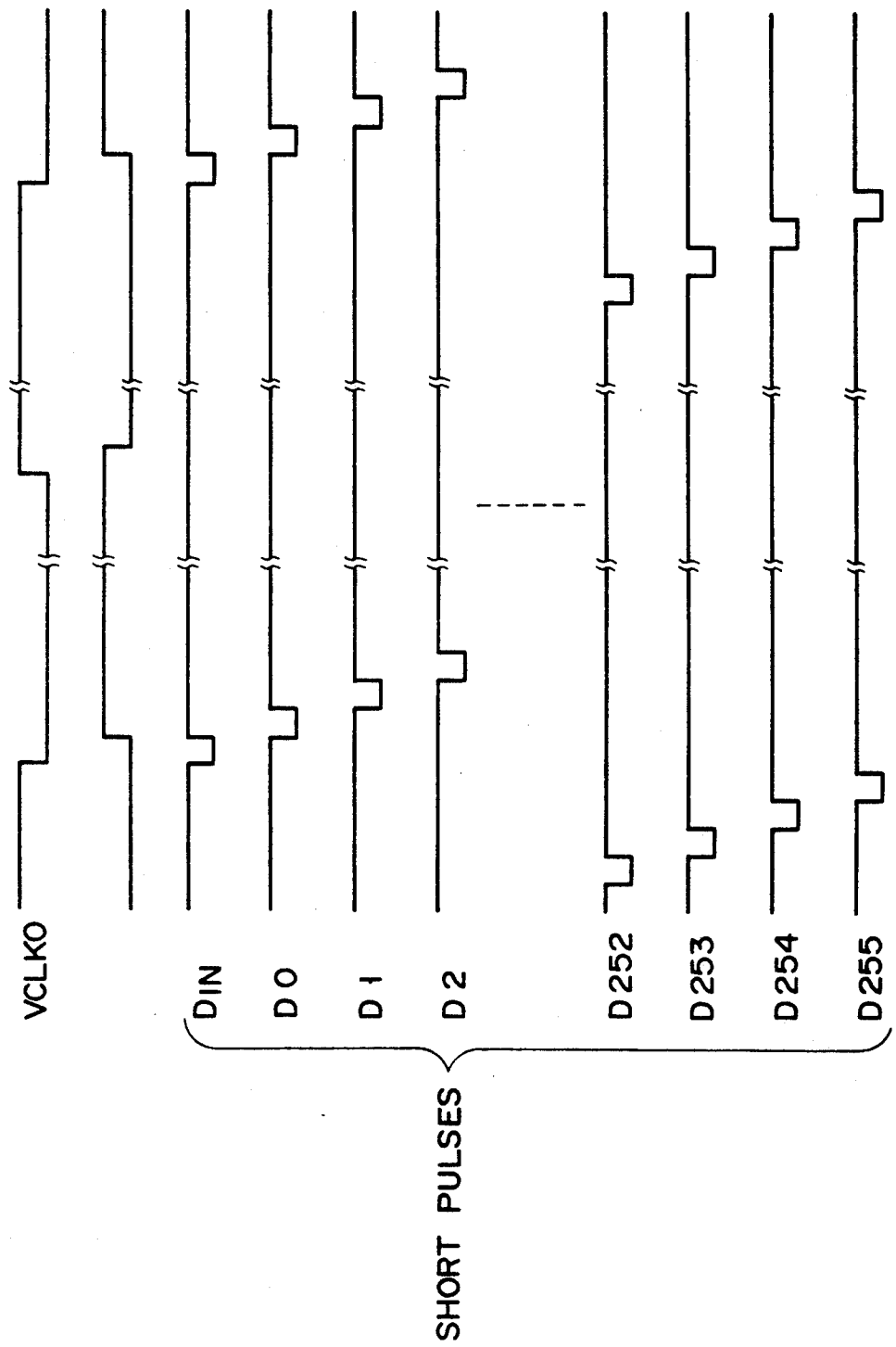
FIG. 11 is a timing chart for explaining differential pulses sequentially output from a delay circuit shown in FIG. 10.
Figure 12:
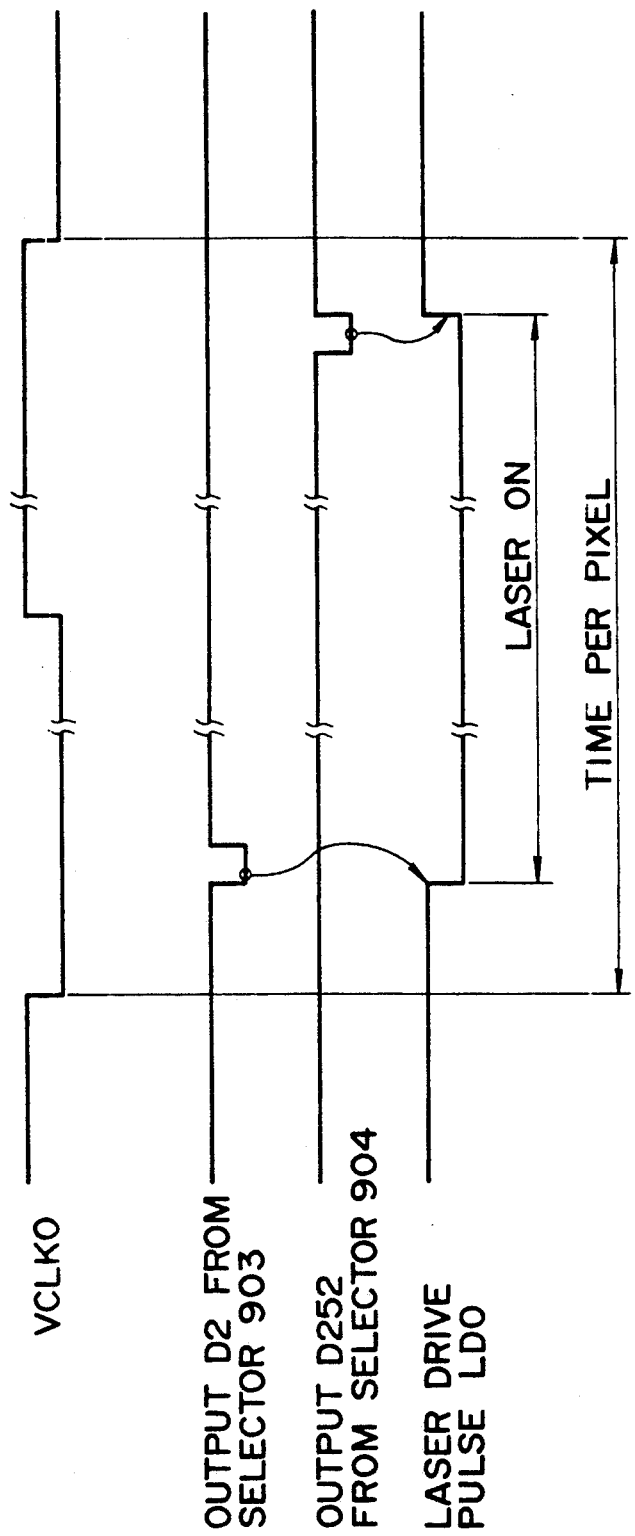
FIG. 12 is a timing chart for explaining rise and fall timing selection signals output from a decoder of FIG. 10 and a laser drive pulse output from a laser drive pulse forming circuit shown in FIG. 10.

Timings will be described with reference to FIGS. 11 and 12. FIG. 11 shows a relationship between the image data transfer clock VCLK0 and the pulse DIN and D0 to D255. As shown in FIG. 11, the pulse D0 to D255 are present within one period of the signal VCLK0. FIG. 12 shows a case wherein D2 is used as a rise timing pulse for the laser drive pulse, and D252 is selected as a fall timing pulse. As shown in FIG. 12, the laser drive pulse rises at the timing corresponding to the pulse D2 and falls at a timing corresponding to the pulse D252.

Figure 13:
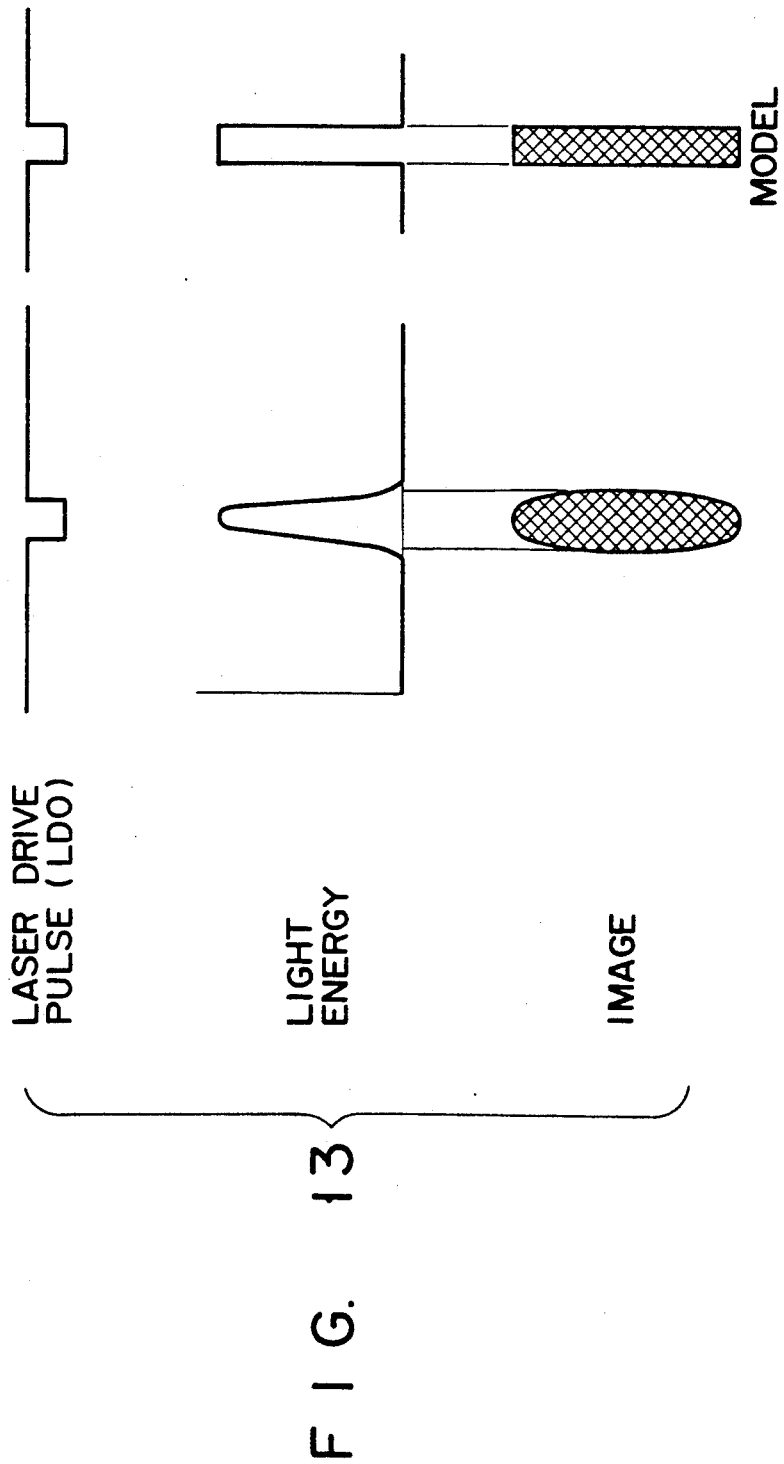
FIGS. 13, 14, and 16, and 17 are views showing a relationship between the laser drive pulses output from the laser drive pulse forming circuit (FIG. 10), the light energy distributions, and the images.

The left portion in FIG. 13 shows a state wherein a light energy of a laser beam is concentrated to explain a relationship between a laser drive pulse (LD0) signal, a light energy distribution, and an image upon emission of a laser for a unit time.

As shown in FIG. 13, a light energy has a steep inverted U-shaped distribution. Since it is difficult to consider such an inverted U-shaped light energy distribution, the light energy distribution is considered as a distribution having a rectangular wave or an image is considered using a rectangular model.

This state corresponds to a state wherein the signal SELA0 to the mirror motor/laser drive circuit 408 is set at high level and oscillation of the laser beam from the semiconductor laser oscillator 90B is selected. That is, the laser beam on the photosensitive drum 20 corresponds to the most focused position. As shown in FIG. 4, the laser beam has a small diameter of $\phi 1$, as shown in FIG. 4.

Figure 14:
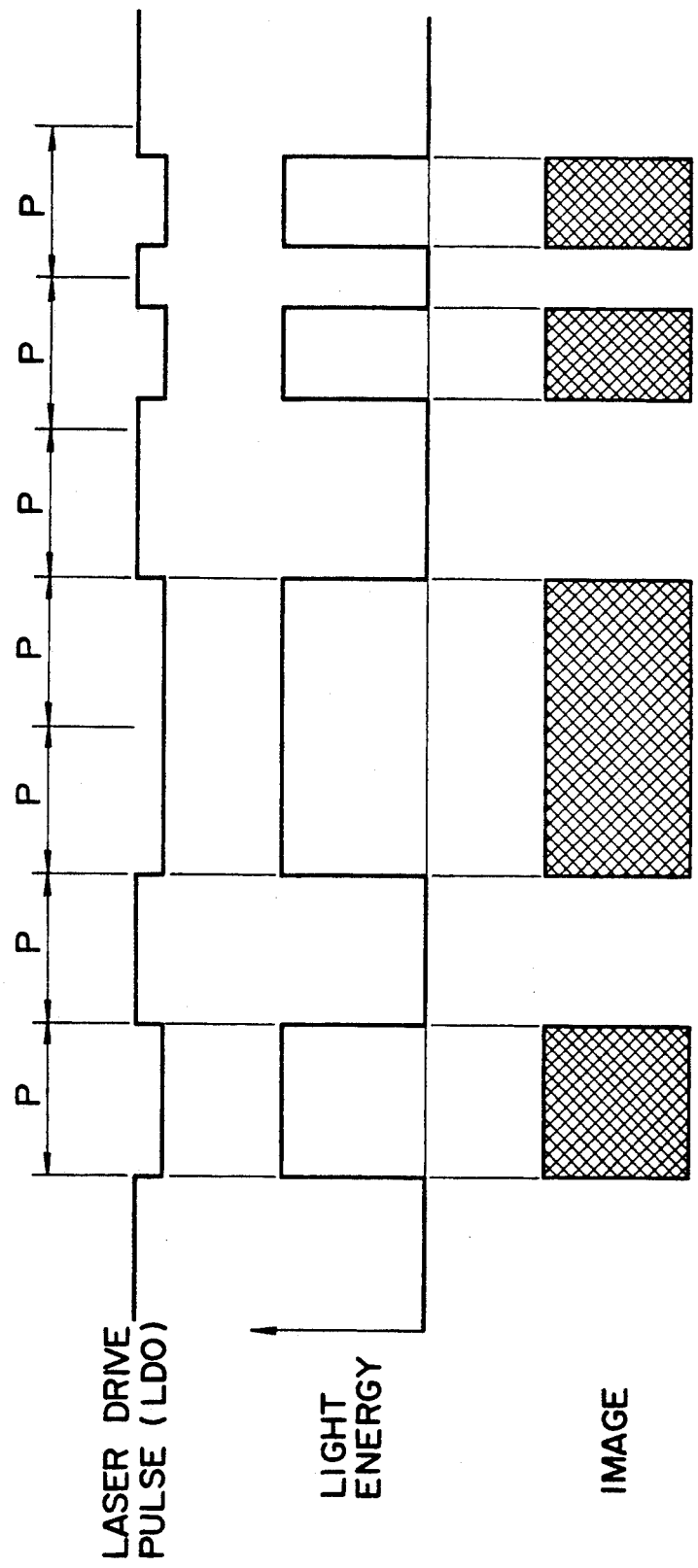

FIG. 14 shows a light energy distribution and an image format when a PWM-modulated laser drive pulse (LD0) is applied as a model laser beam. As is apparent from FIG. 14, when an image is formed while a light energy is concentrated, the image has clear black-and-white contrast and a width equal to that of the laser drive pulse (LD0).

P in FIG. 14 shows the time and distance corresponding to one pixel, and a laser beam is scanned from the left to the right.

As a result, an image in FIG. 15A can be obtained for an image in FIG. 15B. Therefore, an image such as a character or line image having no gradation levels can be printed with high quality.

Figure 16:
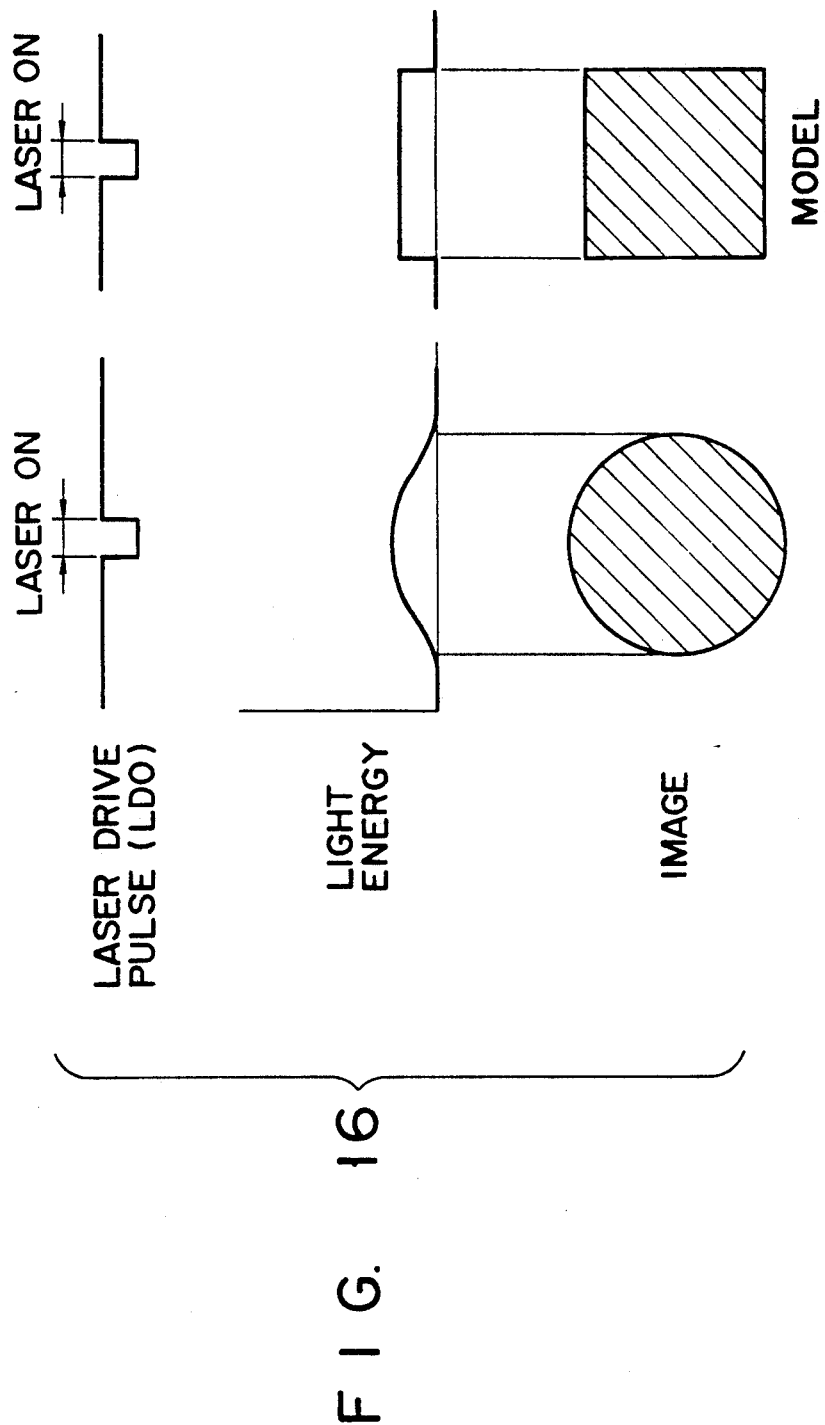

FIG. 16 shows a state wherein a laser beam energy distribution is less steep than that in FIG. 13, to explain a relationship between the laser drive pulse (LD0) signal, the light energy distribution, and the image upon emission of a laser for a unit time.

As shown in FIG. 16, the light energy has a slow inverted U-shaped distribution. The total light energy is the same as in FIG. 13. As compared with FIG. 13, the image corresponds to a portion having a low light energy and a low density per unit area.

When this state is modeled, as shown in FIG. 13, the light energy distribution can be approximated to have a horizontally elongated rectangular waveform, and the image can be approximated to have almost a square shape.

This state corresponds to a state wherein the signal SELA0 is set at low level and oscillation of the laser beam from the semiconductor laser oscillator 90A is selected. That is, the laser beam on the photosensitive body 20 corresponds to a position shifted from the most focused position. As shown in FIG. 4, the laser beam has a large spot size $\phi 2$.

Figure 17:
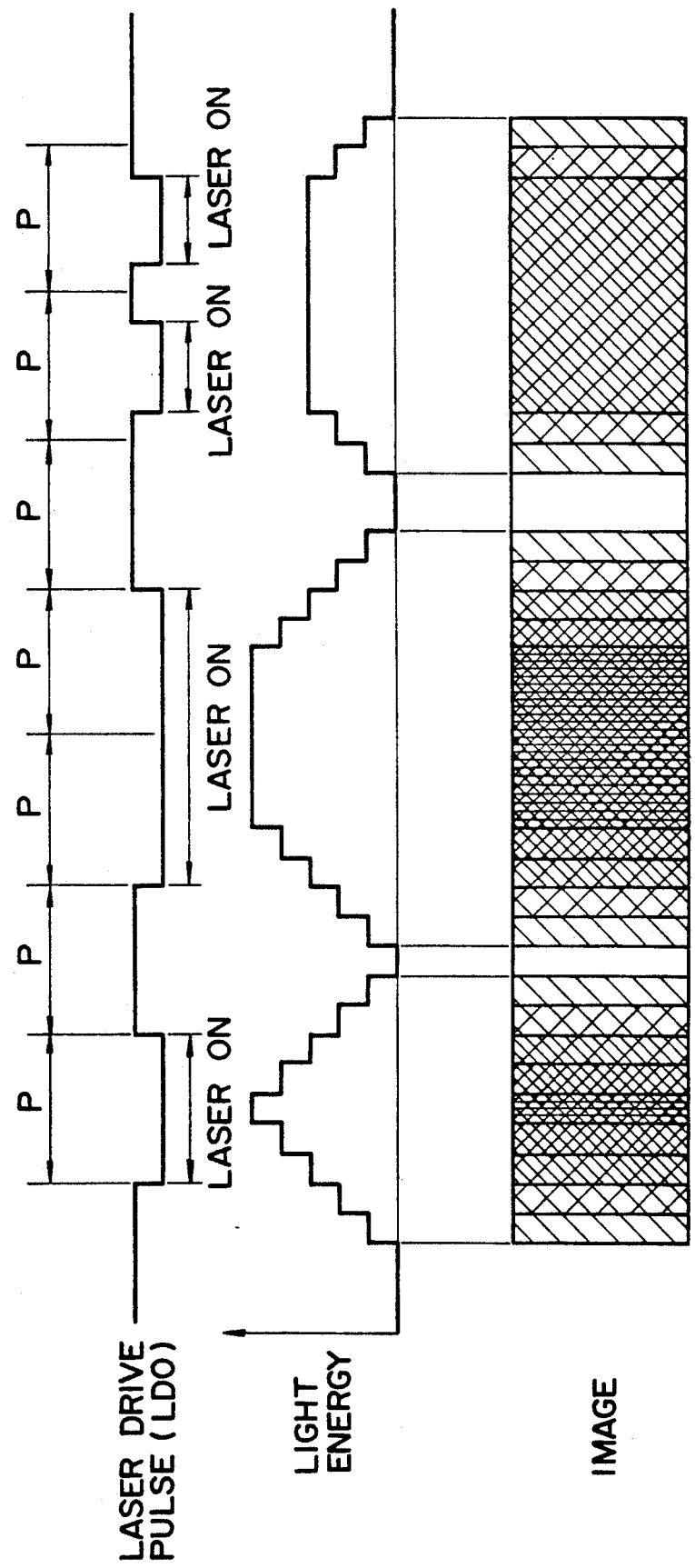

FIG. 17 shows a model of a light energy distribution and an image when the same signal as the PWM-modulated laser drive pulse (LD0) signal shown in FIG. 14 is applied using a laser beam (FIG. 16) whose light energy is dispersed to some extent.

As is apparent from FIG. 17, when the light energy is dispersed, the light energy is distributed in an inverted U-shape. An intermediate energy level which is not represented in FIG. 14 can be output. When the photosensitive body 20 is exposed and developed with such a light energy distribution, a halftone image can be reproduced. The image shown in FIG. 17 has a higher density when the light energy is higher.

An image such as a photograph having gradation levels can be printed with good image quality.

As described above, the shape of an image write laser beam can be changed in accordance with the type of image to be recorded. That is, the spot size of the write laser beam is set small (thin) when an image such as a character or line image having no gradation levels is to be recorded. However, the spot size of the write laser beam is set large (thick) when an image such as a photograph having gradation levels is to be recorded. Any image can be reproduced with high quality.

The two semiconductor laser oscillators 90A and 90B are arranged to have different optical path lengths to the photosensitive body 20, and oscillation is switched between the two semiconductor laser oscillators 90A and 90B to change the shape of the laser beam on the photosensitive body 20.

Since the beam shape of the laser beam is controlled at accurate timings, a good image can be obtained, and reproduction of a thin line and reproduction of gradation on a single image can be simultaneously improved.

The two semiconductor laser oscillators 90A and 90B may be set to have different radiation intensity distributions by using the half mirror while the optical path lengths from the two semiconductor laser oscillators 90A and 90B to the photosensitive body 20 are kept equal to each other. In this case, the shape of the laser beam on the photosensitive body 20 can be similarly changed.

Alternatively, the two semiconductor laser oscillators 90A and 90B may be set to have different wavelengths by using the half mirror to change the beam shape of the laser beam on the photosensitive body 20.

For example, the wavelength of one semiconductor laser oscillator 90A is set to be 790 nm, and the wavelength of the other semiconductor laser oscillator 90B is set to be 670 nm. The laser beam generated by the semiconductor laser oscillator 90A can have a light energy more dispersed than that of the laser beam generated by the semiconductor laser oscillator 90B.

In the above embodiment, the two semiconductor laser oscillators 90A and 90B are arranged, and the shape of the laser beam on the photosensitive body 20 is changed. However, a lens may be arranged between a semiconductor laser oscillator and a polygonal mirror to change a focal length upon a change in refractive index of the lens, thereby changing the shape of the laser beam on the photosensitive body 20.

Figure 18:
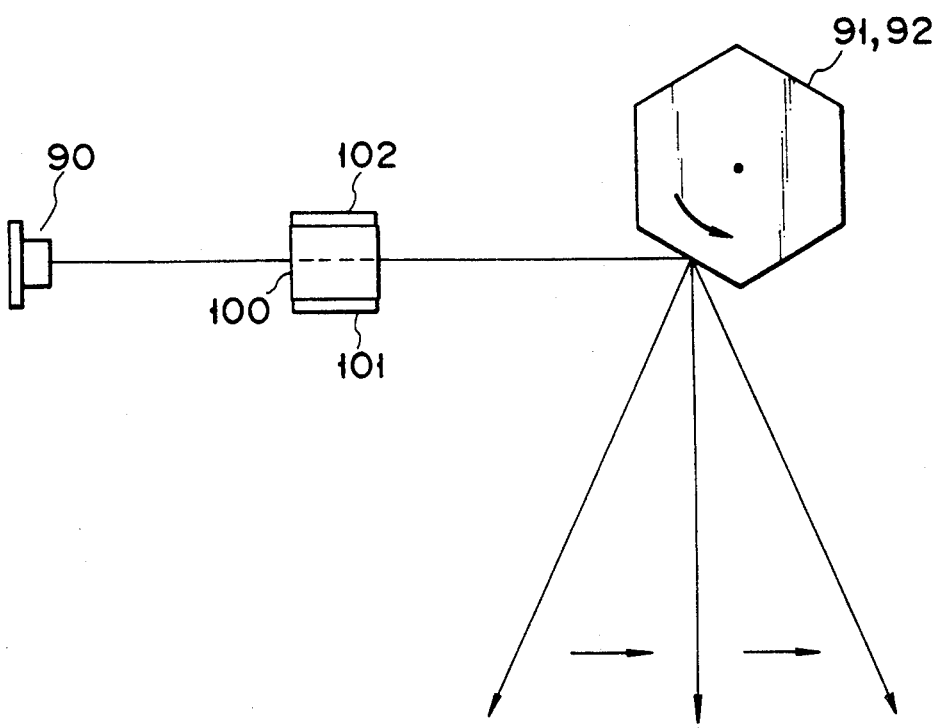
FIG. 18 is a view for explaining the main part of a laser exposure unit according to another embodiment.

For example, as shown in FIG. 18, one semiconductor laser oscillator 90 is arranged, and a laser beam from the semiconductor laser oscillator 90 is guided to a polygonal mirror 91 through a transparent lens 100. The lens 100 is made of a glass or plastic material or the like. Piezoelectric elements 101 and 102 are arranged at end portions of the lens 100. The refractive index (focal length) of the lens 100 can be changed in accordance with distortion caused upon supply of a current to the piezoelectric elements 101 and 102.

The light energy distribution on the photosensitive body 20 can be changed in accordance with a change in refractive index of the lens 100, as shown in FIG. 4.

The laser beam a1 shown in FIG. 4 shows a case wherein the photosensitive body 20 is exposed at a point where the laser beam has the minimum size, and no current is supplied to the piezoelectric elements 101 and 102.

The laser beam a2 in FIG. 4 has a larger size on the photosensitive body 20 than that of the laser beam a1 in a state wherein a current is supplied to the piezoelectric elements 101 and 102 and the refractive index of the lens 100 is changed.

Figure 19:
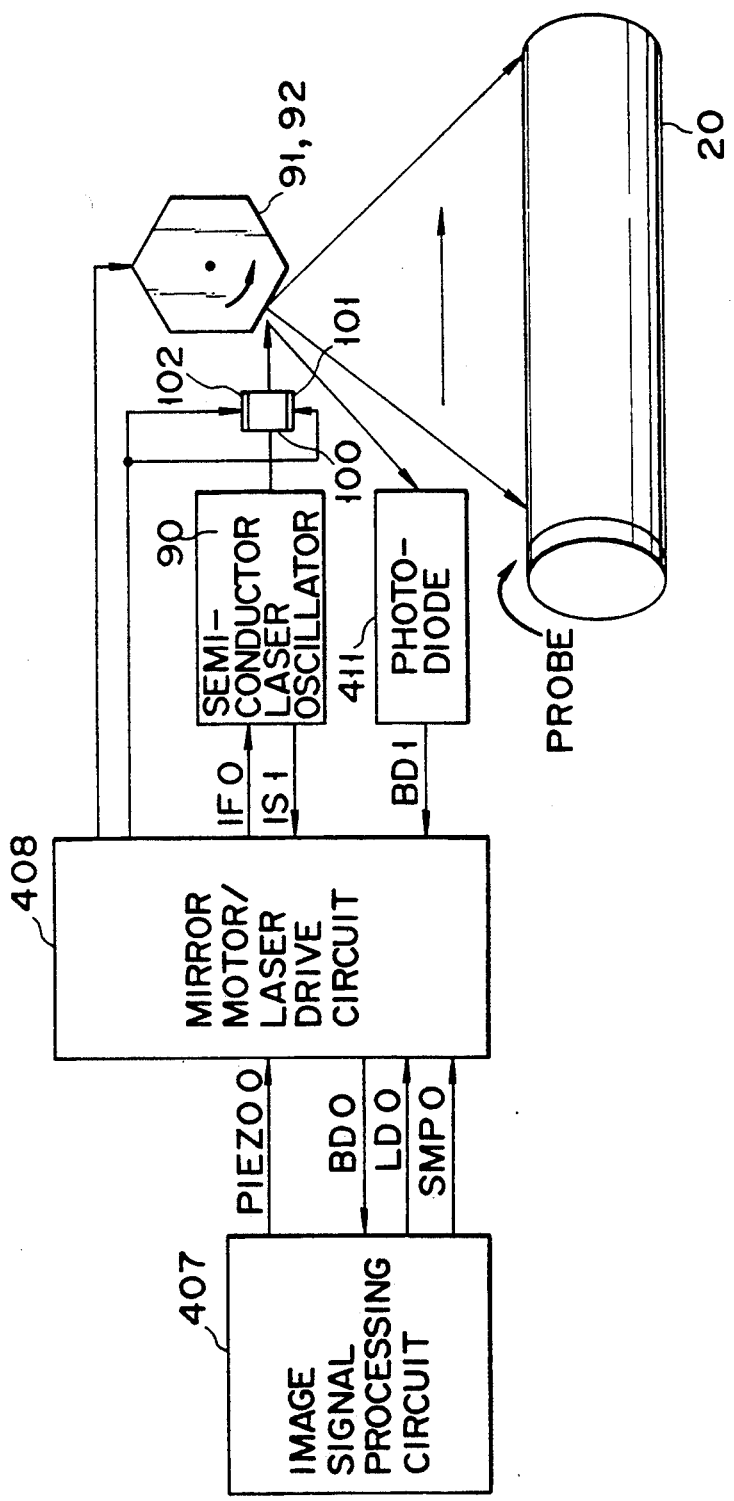
FIG. 19 is a view for explaining a signal supply state of the main part of a control system of the embodiment shown in FIG. 18.

As shown in FIG. 19, a signal PIEZ00 is supplied to the mirror motor/laser drive circuit 408 in place of the signal SELA0 signal (i.e., the selection signal for the semiconductor laser oscillators 90A and 90B). When the signal PIEZ00 is set at high level (i.e., the signals ICRCT0 and CRCT0 are set at low level), a current doesn't flow between the piezoelectric elements 101 and 102.

When the signal PIEZ00 in set at low level, a current flows between the piezoelectric element 101 and 102.

Since the lens 100 is arranged between the semiconductor laser oscillator 90 and the polygonal mirror 91 the laser beam is guided from the oscillator 90 to the polygonal mirror 91 through the lens 100. Further, since the focal length of the laser beam from the semiconductor laser oscillator is changed by changing the refractive index of the lens 100 the shape of the laser beam spot on the photosensitive body can be changed.

Since the beam shape of the laser beam can be changed at accurate timings, a good image can be obtained, and a thin line and a gradation image can be simultaneously reproduced with high quality.

The optical path length from the semiconductor laser oscillator 90 to the polygonal mirror 91 may be changed upon movement of the entire laser exposure unit 22.

Figure 20:
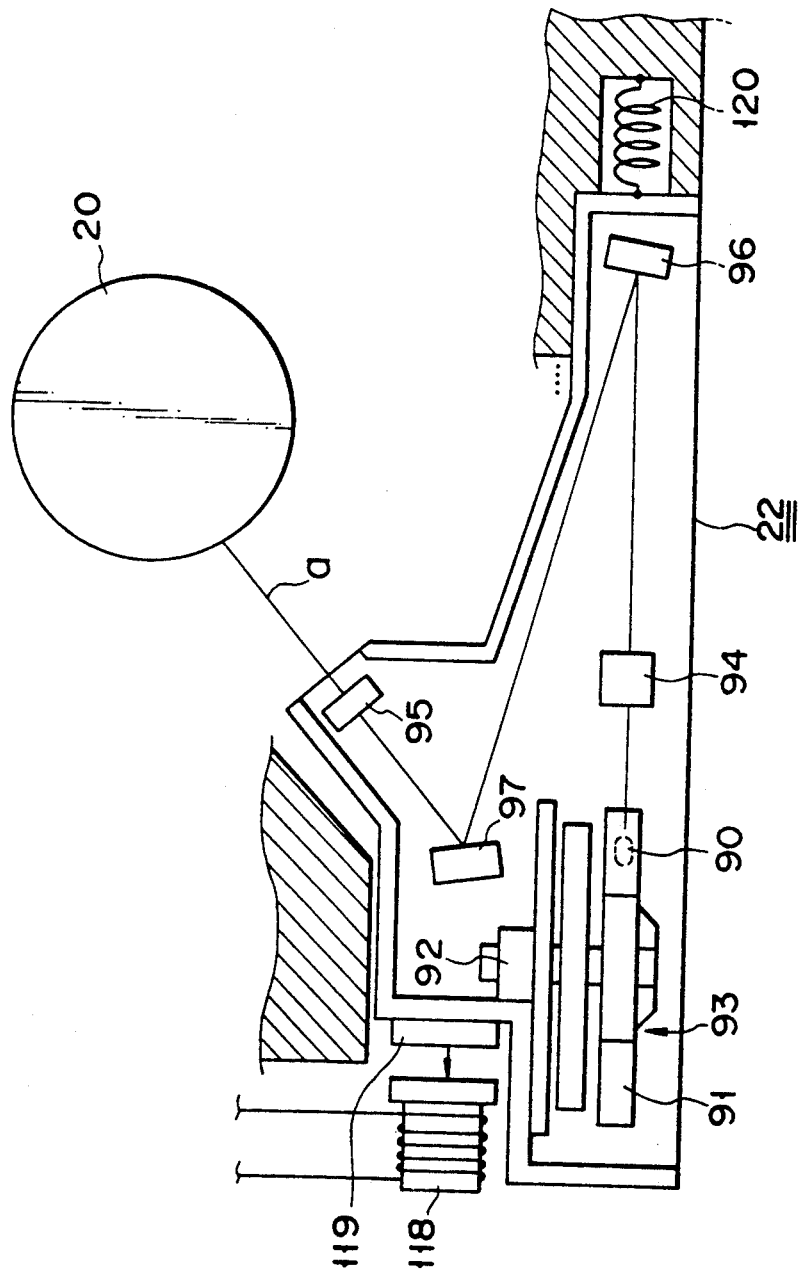
FIG. 20 is a view for explaining the laser exposure unit according to another embodiment.

In this case, as shown in FIG. 20, in the laser exposure unit 22, a magnetic body 119 such as an iron plate attracted to a solenoid 118 is fixed, and the laser exposure unit 22 is attracted to the solenoid 118 upon supply of a current to the solenoid 118 in a direction indicated by an arrow.

When current supply to the solenoid 118 is stopped, the laser exposure unit 22 returns to the original position by a biasing force of a spring 120. A hatched portion indicates a housing of the image forming apparatus. The laser exposure unit 22 is slid along this housing in the right-and-left direction.

As described above, upon movement of the laser exposure unit 22, the optical path length from the semiconductor laser oscillator 90 to the photosensitive body 20 is changed, and the beam shape, i.e., the light energy distribution of the laser beam on the photosensitive body 20 is changed.

FIG. 4 is an enlarged plan view of a portion irradiated with the laser beam a when the optical path length is changed. The laser beam a is gradually converged from the laser exposure unit 22 to expose the photosensitive body 20. In the illustrated case, the laser beam a1 exposes the photosensitive body 20 at a point corresponding to the minimum size of the laser beam. In this case, a current does not flow through the solenoid 118, and the laser exposure unit 22 is located closer to the photosensitive body 20 in FIG. 20.

The laser beam a2 corresponds to a state wherein a current flows through the solenoid 118 shown in FIG. 20 and the laser exposure unit 22 is separated from the photosensitive body 20.

Note that the solenoid 118 is turned off in accordance with a command from the external device 401 when an input image is an image such as a character line image having no gradation levels and is turned on when the input image is an image such as a photograph having gradation levels.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical apparatus for forming a latent image on an image bearing member, comprising:
   means for generating a laser beam;
   means for focusing the laser beam from the generating means with a predetermined focal length;
   means for exposing the image bearing member to the laser beam focused by the focusing means so as to form the latent image thereon, the laser beam exposed on the image bearing member having a first light energy distribution; and
   means for changing an optical path length of the laser beam from the generating means to the image bearing member so as to change the light energy distribution of the laser beam on the image bearing member from the first light energy distribution to a second light energy distribution different from the first light energy distribution.

2. An apparatus according to claim 1, wherein the changing means moves said generating means and focusing means to change a focal point at which the laser beam is focused by the focusing means.

3. An apparatus according to claim 1, wherein the changing means has means for chaning a refractive index of the focusing means to change a focal point at which the laser beam is focused by the focusing means.

4. An apparatus according to claim 1, further comprising output means for outputting a laser beam driving signal for the laser beam generated by the generating means, the output means comprising:
   timing clock generating means for generating a timing clock;
   first pulse generating means for generating micropulses in response to the timing clock generated by the timing clock generating means;
   second pulse generating means for generating micropulses at a plurality of timing which delay the micropulses generated by the first pulse generating means;
   first output means for outputting a pulse selection signal and pulse position data corresponding to image data;
   second output means for outputting a selection signal for determining the pulse width and the timing on the basis of the pulse position data and pulse selection signal which are output from the first output means;
   means for selecting two of the micropulses generated from the second pulse generating means at a plurality of timings, in response to the selection signal output from the second output means, and outputting the selected pulses a rise and fall timing pulses; and
   third output means for outputting a laser beam driving signal corresponding to a period between the rise timing pulse and the fall timing pulse both output from the selecting means.

5. An optical apparatus adapted for an image forming apparatus for forming a latent image on an image bearing member, comprising:
   first and second generating means for generating a laser beam, the first and second generating means being located at positions having different optical path lengths to the image bearing member, respectively; means for focusing the laser beams from the first and second generating means with predetermined focal lengths, respectively;
   means for exposing the image bearing member to the laser beams generated by the first and second generating means and focused by the focusing means, so as to form the latent image on the image bearing member; and
   means for selecting one of the first and second generating means, so that an energy distribution of the laser beam to which the image bearing member is exposed may be changed in accordance with the selected generating means.

6. An apparatus according to claim 5, further comprising a half mirror located between the first generating means and the second generating means, a distance between the first generating means and the half mirror being different from that between the second generating means and the half mirror, the half mirror permitting the laser beam from the first generating means to pass therethrough and be guided to the focusing means, and permitting the laser beam from the second generating means to pass therethrough and be guided to the focusing means.

7. An apparatus according to claim 5, further comprising output means for outputting a laser beam driving signal for the laser beams generated by the first and second generating means, the output means comprising:
   timing clock generating means for generating a timing clock;
   first pulse generating means for generating micropulses in response to the timing clock generated by the timing clock generating means;
   second pulse generating means for generating micropulses at a plurality of timings which delay micropulses generated by the first pulse generating means;
   first output means for outputting a pulse selection signal and pulse position data corresponding to image data;
   second output means for outputting a selection signal for determining the pulse width and the timing on the basis of the pulse position data and pulse selection signal which are output from the first output means;
   means for selecting two of the micropulses generated from the second pulse generating means at a plurality of timings in response to the selection signal from the second output means, and outputting the selected pulses as rise and fall timing pulses; and
   third output means for outputting a laser beam driving signal corresponding to a period between the rise timing pulse and the fall timing pulse both output from the selecting means.

8. An optical apparatus for forming a latent image on an image bearing member, comprising:
   first generating means for generating a laser beam having a first wavelength;
   second generating means for generating a laser beam having a second wavelength;

means for focusing the laser beams from the first and second generating means with predetermined focal lengths;

means for exposing the image bearing member to one of the laser beams generated by the first and second generating means and focused by the focusing means, so as to form the latent image on the image bearing member; and means for selecting one of the first and second generating means, so that an energy distribution of the laser beam to which the image bearing member is exposed may be changed in accordance with the selected generating means.

* * * * *